(12) United States Patent
Yuan et al.

(10) Patent No.: US 12,118,981 B2
(45) Date of Patent: Oct. 15, 2024

(54) DETERMINING MULTILINGUAL CONTENT IN RESPONSES TO A QUERY

(71) Applicant: GOOGLE LLC, Mountain View, CA (US)

(72) Inventors: Wangqing Yuan, Wilmington, MA (US); Bryan Christopher Horling, Belmont, CA (US); David Kogan, Natick, MA (US)

(73) Assignee: GOOGLE LLC, Mountain View, CA (US)

( * ) Notice: Subject to any disclaimer, the term of this patent is extended or adjusted under 35 U.S.C. 154(b) by 495 days.

(21) Appl. No.: 17/475,897

(22) Filed: Sep. 15, 2021

(65) Prior Publication Data
US 2023/0084294 A1    Mar. 16, 2023

(51) Int. Cl.
| | |
|---|---|
| G10L 15/00 | (2013.01) |
| G10L 13/08 | (2013.01) |
| G10L 15/22 | (2006.01) |
| G10L 15/26 | (2006.01) |

(52) U.S. Cl.
CPC ............ G10L 13/086 (2013.01); G10L 15/22 (2013.01); *G10L 2015/223* (2013.01); *G10L 2015/225* (2013.01)

(58) Field of Classification Search
CPC ........ G06F 40/58; G06F 3/167; G06F 3/0482; G06F 16/3329; G06F 40/40; G06F 40/47; G06F 40/263; G06F 3/017; G06F 3/04886; G06F 16/3337; G06F 16/90332; G06F 16/338; G06F 9/454; G06F 16/248;
(Continued)

(56) References Cited

U.S. PATENT DOCUMENTS

| | | | |
|---|---|---|---|
| 6,192,344 B1 * | 2/2001 | Lee ................. | H04M 3/533 704/277 |
| 6,999,932 B1 * | 2/2006 | Zhou .................. | G10L 15/005 704/E15.044 |

(Continued)

FOREIGN PATENT DOCUMENTS

| | | |
|---|---|---|
| WO | 2017112813 | 6/2017 |
| WO | WO-2021053391 A1 * | 3/2021 |

OTHER PUBLICATIONS

Tillman, Maggie; "Interpreter mode: How to translate conversations with Google Assistant" Retreived from https://www.pocket-lint.com/smart-home/news/google/146993-how-to-use-google-assistant-s-interpreter-mode. 5 pages. Dated Dec. 12, 2019. 2019.

*Primary Examiner* — Olujimi A Adesanya
(74) *Attorney, Agent, or Firm* — Gray Ice Higdon

(57) ABSTRACT

Implementations relate to determining multilingual content to render at an interface in response to a user submitted query. Those implementations further relate to determining a first language response and a second language response to a query that is submitted to an automated assistant. Some of those implementations relate to determining multilingual content that includes a response to the query in both the first and second languages. Other implementations relate to determining multilingual content that includes a query suggestion in the first language and a query suggestion in a second language. Some of those implementations relate to pre-fetching results for the query suggestions prior to rendering the multilingual content.

19 Claims, 7 Drawing Sheets

(58) Field of Classification Search
CPC ..... G06F 40/45; G06F 16/2452; G10L 15/26; G10L 15/22; G10L 13/086
See application file for complete search history.

(56) References Cited

U.S. PATENT DOCUMENTS

| | | | | |
|---|---|---|---|---|
| 7,984,034 B1* | 7/2011 | Shaw | | G06F 16/3337 |
| | | | | 707/726 |
| 8,055,495 B2* | 11/2011 | Sumita | | G06F 40/40 |
| | | | | 704/275 |
| 8,224,836 B1* | 7/2012 | Piratla | | G06F 16/951 |
| | | | | 707/769 |
| 9,239,832 B2* | 1/2016 | Patel | | G06F 40/58 |
| 9,262,405 B1* | 2/2016 | Baliga | | G06Q 30/0255 |
| 9,483,461 B2* | 11/2016 | Fleizach | | G10L 13/033 |
| 11,163,785 B2* | 11/2021 | Ito | | G06F 3/0482 |
| 2004/0194099 A1* | 9/2004 | Lamping | | G06F 16/9538 |
| | | | | 718/100 |
| 2008/0005100 A1* | 1/2008 | Hsu | | G06F 16/7844 |
| | | | | 707/999.005 |
| 2010/0030549 A1* | 2/2010 | Lee | | G06F 3/0482 |
| | | | | 704/4 |
| 2013/0031166 A1* | 1/2013 | Jayaraman | | G06F 40/58 |
| | | | | 709/203 |
| 2013/0253900 A1* | 9/2013 | Escobedo | | G10L 13/00 |
| | | | | 704/2 |
| 2014/0280295 A1* | 9/2014 | Kurochkin | | G06F 16/3337 |
| | | | | 707/769 |
| 2015/0206525 A1* | 7/2015 | Ryder | | G06F 16/9038 |
| | | | | 704/260 |
| 2015/0220602 A1* | 8/2015 | Billou | | G06F 16/9537 |
| | | | | 707/706 |
| 2015/0234920 A1* | 8/2015 | Tawfik | | G06F 16/951 |
| | | | | 707/724 |
| 2015/0363757 A1* | 12/2015 | Mocko | | G07G 1/01 |
| | | | | 705/16 |
| 2016/0328468 A1* | 11/2016 | Bolshinsky | | G06F 16/24522 |
| 2017/0091175 A1* | 3/2017 | Kanayama | | G06F 40/58 |
| 2017/0366827 A1* | 12/2017 | Gordon | | H04N 21/23418 |
| 2018/0052826 A1* | 2/2018 | Chowdhary | | G06F 40/58 |
| 2018/0063317 A1* | 3/2018 | Simpson | | H04M 1/72445 |
| 2018/0276203 A1* | 9/2018 | Cuthbert | | G10L 25/48 |
| 2018/0329877 A1* | 11/2018 | Gupta | | H04L 67/025 |
| 2019/0034080 A1* | 1/2019 | Nagel | | G06F 40/58 |
| 2019/0042285 A1* | 2/2019 | Shin | | G06F 3/167 |
| 2019/0102480 A1* | 4/2019 | Sreedhara | | G10L 25/54 |
| 2019/0213915 A1* | 7/2019 | Tan | | G06F 40/205 |
| 2020/0066254 A1* | 2/2020 | Hiroe | | H04W 4/00 |
| 2020/0142890 A1* | 5/2020 | Zhang | | G06F 16/2452 |
| 2020/0233917 A1* | 7/2020 | Kurtanovic | | G06F 9/547 |
| 2021/0089621 A1* | 3/2021 | Molander | | G06F 40/58 |
| 2022/0405471 A1* | 12/2022 | Kogan | | G10L 15/19 |

* cited by examiner

DETERMINING MULTILINGUAL CONTENT IN RESPONSES TO A QUERY

BACKGROUND

A user may have interest in learning a second language and to utilize an automated assistant by communicating in the second language. For example, the user may utilize a first language, that is the primary language of the user, in interactions with an automated assistant and further utilize a second language to interact with the automated assistant. The user may not be as proficient in the second language, such as instances where the user is learning the second language.

When interacting with an automated assistant, interaction(s) can fail and/or be prolonged when the queries that are provided to the automated assistant are not well-formed, such as being grammatically correct. A user can expect the same or similar behavior of the automated assistant in instances where a query is submitted in a first language as well as instances where a query with the same intent is submitted in a second language. However, the user may not be aware of how to form a query with similar intent in a second language when the proficiency of the user in the second language is lower than proficiency in the first language. For example, a user may submit a query in a first language, to an automated assistant, with an expectation of a particular result and may have interest in submitting a second query in a second language with an expectation of the same or a similar result but may not submit a query that is as well-formed as the query in the first language.

SUMMARY

Implementations disclosed herein relate to receiving audio data that includes a spoken query of the user in a first language, generating a first language response in the first language, generating a second language response to the query in a second language, determining to render content that includes the first language response and the second language response based on verification data included with the audio data, and causing the content to be rendered to an assistant interface. Subsequently, the user may interact with the rendered content, such as being provided with synthesized audio of a speaker uttering the first and/or second language response. In some implementations, a user proficiency in the second language can be determined and content rendered to the user can be determined based further on the user proficiency measure.

In some implementations, a user may interact with an automated assistant by uttering a query that includes a request for the automated assistant to perform one or more tasks. For example, the user may utter a query that includes the phrase "set a timer for 10 minutes." In response, the automated assistant can start a timer that alerts the user when ten minutes has elapsed. Other examples of queries include submitting a request to be provided with an audible response, such as a question with the intention of being provided with an answer (e.g., "how tall is the president"), to control one or more devices (e.g., "turn on the kitchen light"), and/or to be provided with a graphical response via an interface (e.g., "show me a map of San Francisco").

In some implementations, the user has indicated a primary language that indicates a language for responses from the automated assistant. The primary language may be indicated by a parameter that is associated with an account of the user. When the user submits a query, the automated assistant can check the account of the user to determine what language to render the response.

In some implementations, a user may have interest in being provided with multilingual responses to a query. The response may be rendered via an interface of a client and/or provided as synthesized speech via a microphone. For example, a user may submit a query that includes a request for an automated assistant to perform a task. The automated assistant can perform the task as well as provide feedback via an interface of a client device.

In some implementations, a user may have interest in being provided with a translation of a query into a second language. The user interest in being provided a response in a second language (i.e., a language other than the primary language of the user) and the automated assistant can process the query such that a response is generated to be provided to the user. In addition to or in lieu of the response, the user can be provided the response translated into a specified second language. For example, for a request to set a timer, the automated assistant may render content that includes a speech confirmation of the timer being set (e.g., "I set a timer for 10 minutes) and further the user may be provided with a translation of the query (e.g., "Please set a timer"), as text via a GUI and/or via synthesized speech.

In some implementations, an interface can be rendered in response to a determination that the user has interest in being provided with multilingual content. The interface can include both the response in a first language that is the primary language of the user and a response in a second language. For example, a user may query, in a first language, that a task be performed by the automated assistant. The rendered response can be the query translated into a second language in addition to a confirmation that the task was performed. Also, for example, the user can submit a query and be provided, as a response, a confirmation, in the first language, that the task was performed as well as a translation, into a second language, of the confirmation that the task was performed. Put another way, the multilingual content may include a translation of the query into a second language and/or a translation of the response to the query into a second language.

In some implementations, a query suggestion can be rendered via the interface. A query suggestion may include, for example, a follow-up query that is likely to follow the query that was initially provided by the user. For example, for a query, provided by the user, of "What is the weather," the user may be provided with the current weather at the location of the user. As a query suggestion, the user can be provided with "What is the weather going to be tomorrow," a possible follow-up query to the user's initial query. In some implementations, a translation of the query suggestion in the second language may be provided in addition to or in lieu of the query suggestion in the primary language of the user. For example, the user may also be provided, via the interface, with "que tiempo hara manana" in the second language of Spanish (i.e., Spanish for "what is the weather going to be tomorrow"). The user may select one of the responses, either the English or Spanish version, and be provided with an audible pronunciation of the selected response, followed by an audible rendering of the non-selected response. For example, selecting the English version can result in the English query suggestion followed by the Spanish query selection. Conversely, selecting the Spanish version can result in the Spanish query suggestion being rendered audibly followed by the English version being rendered audibly.

In some implementations, the response to a query suggestion may be determined prior to providing the query suggestion. For example, a response can be generated for a query provided by the user, query suggestions can be generated, and then the query suggestions can be executed by an automated assistant, with the responses to the query suggestions cached for usage if the user selects one of the query suggestions. Thus, a first response to the query suggestion in the first language can be generated and a second response to the query suggestion in the second language can be generated. When the user selects the query suggestion in the first language, the cached first response can be provided to the user, followed by the second response. Conversely, when the user selects the query suggestion in the second language, the cached second response can be provided to the user, followed by the second response. Pre-fetching responses in this manner mitigates the need to generate multiple responses that include the same information, thus conserving computing resources that would be required to generate the first response, the second response, a response that includes the first response followed by the second response, and a response that includes the second response followed by the first response.

In some implementations, one or more actions may be performed in addition to a query suggestion being rendered. For example, a user may utter, in English, of "Set a timer for 5 minutes." In addition to the user being provided with a follow-up query suggestion in a second language, such as "shut off the timer" in a second language, the automated assistant can perform the action of setting a timer. Thus, in addition to the functionality of providing query suggestions to the user, the automated assistant can perform the tasks and/or actions that are indicated by the initial query of the user.

In some implementations, verification data may be received with a query that indicates that the user is interested in being provided with a multilingual response. Verification data can include information identifying the user that submitted the query. For example, verification data can include information related to an account of the user, identifying information for the device that the user utilized in submitting the query, and/or other unique verification information that can be utilized to determine the user that submitted the query. In some instances, the verification data may be generated by one or more components executing on the client device. In some instances, the verification data may be generated by one or more components executing remotely from the device based on the received audio data. For example, a component that receives the spoken query can analyze the query to identify, based on voice recognition, the user that spoke the query.

In some implementations, multilingual content may be provided only in instances where a user interest measure indicates that the user has interest in being provided with the multilingual content. In some instances, the user interest measure may be a parameter associated with an account of the user. In some instances, user interest may be determined based on determining that the user, in past interactions with applications, has accessed resources and/or has submitted queries that are related to a second language.

In some implementations, the user may be associated with a proficiency measure that indicates the proficiency of the user in the second language. In some instances, the proficiency measure may be a parameter associated with an account of the user. For example, the user, when configuring an account, may select a proficiency level for one or more languages, and the value of the proficiency level can be utilized to determine a proficiency measure. Also, for example, one or more components can determine a proficiency measure based on past interactions of the user with one or more applications. For example, historical interactions of the user with an automated assistant, browsing history of the user, and/or other applications that the user may utilize to interact in a second language can be utilized to determine a proficiency measure.

In some implementations, a complexity measure can be determined for a response in the multilingual content in the second language, and the complexity measure can be compared to the proficiency measure of the user in order to determine whether to provide the multilingual content to the user. For example, if the complexity measure exceeds the proficiency measure for the user, the content may not be rendered due to the response being more complicated than the user likely has knowledge in the second language. Also, for example, in instances where multiple translations and/or responses are possible, a response with a complexity measure that does not exceed the proficiency measure of the user may be selected over a second response with a higher complexity measure.

In some implementations, the multilingual content can be rendered via an interface on the client device of the user. The interface may include an indication of the query and the multilingual content. In some implementations, the multilingual content can be rendered with selectable elements that, when interacted with, cause an audible rendering of the corresponding content. For example, for multilingual content that includes the query translated into a second language and the response in the second language, each of the query indication and the response indication may include selectable elements that, when selected, provide synthesized audio of the query in the second language and/or the response in the second language.

Implementations disclosed herein allow for a user to submit a single request and be provided with multilingual content. This mitigates the need for a user to submit multiple requests in order to be provided with additional information in a second language. Reducing the number of requests that require processing reduces resource usage that would otherwise be consumed when a user submits a first query to be provided with a first response in a primary language of the user, and a second query to be provided with a second response in a second language and/or a translation of the first response. Further, implementations disclosed herein additionally or alternatively allow for a user to be provided with well-formed queries and/or query suggestions that are in a second language such that, in future interactions, the user can submit queries in the second language that are more likely to be understood and processed by an automated assistant and/or that will result in more efficient (e.g., shorter duration) interactions with the automated assistant. Providing the user with well-formed phrases in a second language prevents the user from having to submit multiple requests before receiving the response of interest to the user, thereby reducing computing resources required to process a query and/or request translation of a response in a second language.

DETAILED DESCRIPTION

Figure 1:
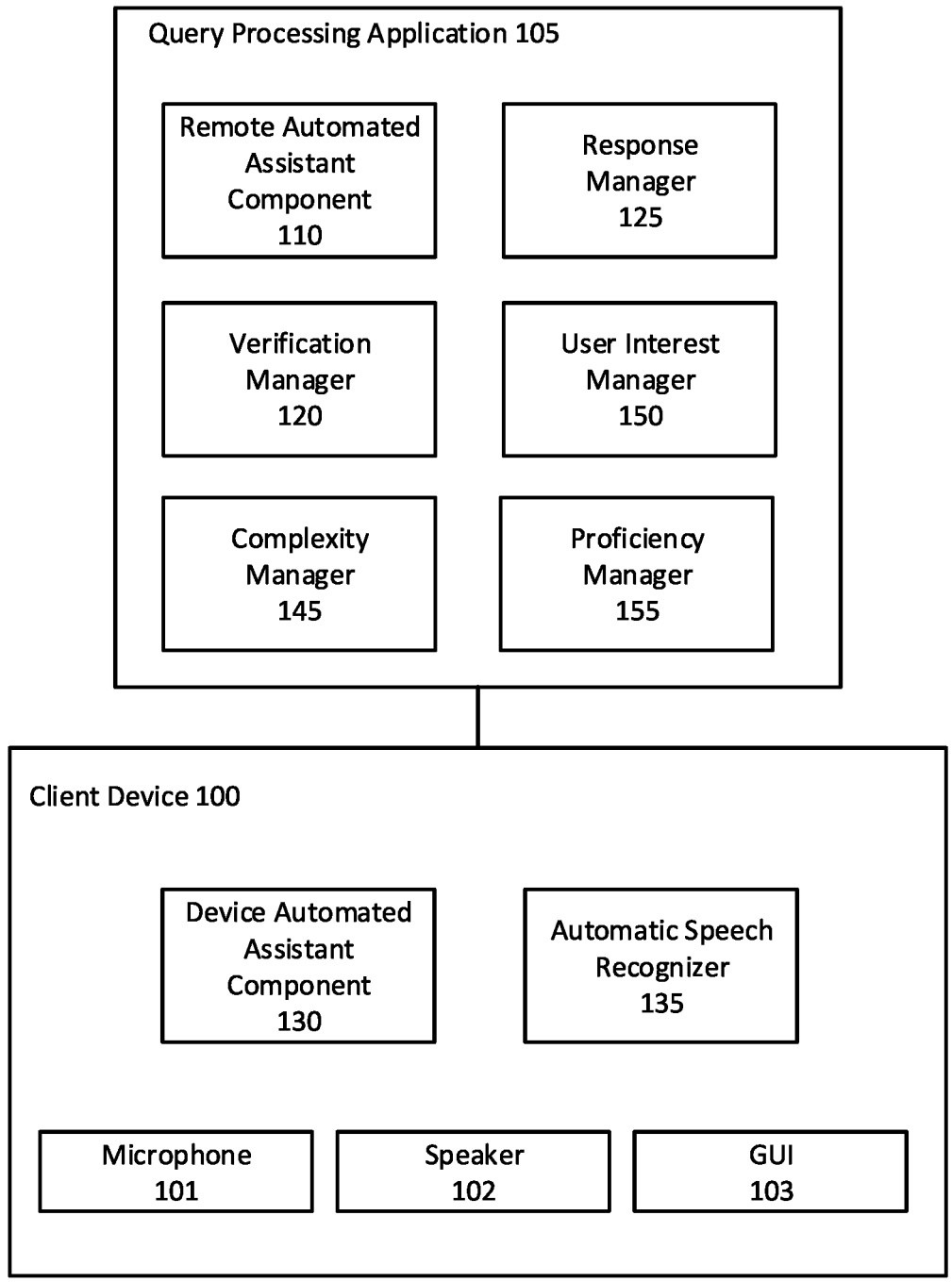
FIG. 1 is an illustration of an example environment in which implementations disclosed herein may be implemented.

Referring to FIG. 1, an example environment in which implementations disclosed herein may be implemented is illustrated. The environment includes a client device 100 and a query processing application 105. In some implementations, query processing application 105 can be executing, entirely or in part, on client device 100. In some implementations, query processing application 105 can be executing, entirely or in part, on a remote computing device that is in communication with client device 100.

Query processing application 105 includes a remote automated assistant component 110. The remote automated assistant component is in communication with the device automated assistant component 130, which is executing on the client device 130. In some implementations, one or more processes that are described with respect to remote automated assistant component 110 may be performed by device automated assistant component 130, and vice versa. For example, in some implementations, voice recognition of a user that is captured by microphone 101 of client device 100 can be performed locally via device automated assistant component 130. Likewise, in some implementations, audio data that is captured by microphone 101 can be provided to remote automated assistant component 110, which can perform voice recognition of a user.

A user may utter a query that is captured by microphone 101, which then may be provided to device automated assistant component 130. Automatic speech recognizer 135 can process the captured audio data and generate a textual representation of the audio data, which then can be provided to remote automated assistant component 110. Alternatively, device automated assistant component 130 may provide the audio data to remote automated assistant component 110, which may then utilize one or more components (not shown) to generate a textual representation of the audio data.

Once the audio data has been processed into a textual query, remote automated assistant component 110, alone or in conjunction with device automated assistant component 130, can perform one or more tasks based on the query. For example, the user may utter the query "turn off the kitchen lights," which then can be processed into textual data and, based on the query, remote automated assistant component 110 can communicate with one or more devices to cause a light to turn off. Also, for example, for a query of "set a timer for 10 minutes," remote automated assistant component 110 can begin a timer. Subsequently, response manager 125 can generate and send confirmation information to device automated assistant component 130, which can then render the confirmation information via GUI 103 and/or audibly via speaker 102, such as a confirmation message of "I have set a timer for 10 minutes."

In some implementations, a user may have interest in being provided with a response, such as a confirmation message, in a language other than the primary language of the user. Further, in some implementations, a user may have interest in being provided with a translation of a query into a second language. The user may have an associated account that includes one or more settings that can have assigned values. In some implementations, the values can be assigned by the user. For example, the user may be provided with a registration interface that includes a setting for a primary language for the user, an option to have query translations and/or responses provided in a specified second language, a proficiency level setting to indicate the user proficiency in the second language, and so on.

Proficiency manager 155 can determine a level of proficiency in the second language for the user. The proficiency measure may be based on one or more settings that are selected by the user and associated with an account of the user. For example, a user can have an account that is associated with the user and includes one or more settings that the user can set that indicate the proficiency level of the user for one or more languages. Proficiency manager 155 can identify the proficiency level indicated by the user and determine a proficiency measure, at least in part, based on the indicated proficiency level.

In some implementations, proficiency manager 155 can utilize one or more past interactions of the user to determine a second language proficiency measure for the user. The interactions can be between the user and one or more applications. In some instances, the second language proficiency measure can be determined by proficiency manager 155 based on the past interactions with particular applications. For example, interactions of the user with select applications may be utilized to determine a second language proficiency measure, while interactions of the user with other applications may not be utilized to determine the second language proficiency measure. As an example, in some implementations disclosed herein, past interactions of the user with one or more applications other than a language learning application can be utilized to determine a second language proficiency measure.

In some implementations, one or more queries that are provided by the user via a spoken utterance may be utilized by proficiency manager 155 to determine a second language proficiency measure for the user. For example, the choice of vocabulary of the user, when submitting spoken queries in the second language, may be indicative of the proficiency of the user. Accordingly, the second language proficiency measure can be determined that reflects the limited vocabulary of the user. Also, for example, grammatical and/or pronunciation errors of the user, when submitting spoken queries in the second language, may be indicative of the second language proficiency of the user. Accordingly, a second language proficiency measure may be determined for a user that submit queries with grammatical and/or pronunciation errors that is less indicative of proficiency than a user that submit spoken queries that are grammatically correct.

In some implementations, proficiency manager 155 can determine a second language proficiency based on interactions of the user that includes the user submitting text in the second language. For example, with permissions from the user, emails of the user that include terms and/or phrases in the second language may be identified and, based on the correctness of the grammar and/or the selection of terms in the emails (or other documents) can be utilized to determine a second language proficiency measure for the user. Also, for example, auto-suggestions that are provided to the user when submitting queries can be utilized to determine a second language proficiency measure (e.g., common terms that are autocorrected can result in a determined second language proficiency measure that is less indicative of proficiency than a user that does not require autocorrect for the same common terms and/or phrases).

In some implementations, a second language proficiency measure can be determined, by the proficiency manager 155, for a user based on the user submitting queries (e.g., spoken queries and/or text queries) that are related to the second language but provided in the primary language of the user. For example, a user may submit a request to device automated assistant component 130 to translate a phrase from the primary language of the user to the second language. The second language proficiency measure can be determined based on complexity of the phrases such that, for example, a user that submits requests for common terms may have a lower determined proficiency measure than a user that submits requests to translate more complex phrases.

In some implementations, user requests for additional information related to the second language can be utilized by proficiency manager 155 to determine a second language proficiency measure for the user. In some implementations, web activity of the user may be utilized by proficiency manager 155 to determine a second language proficiency measure for the user. For example, in addition to submitting requests to translate terms into the second language and/or submitting queries in the second language, the user may submit a request to device automated assistant component 130 and be provided with additional resources related to learning the second language, such as "what is the best way to learn Spanish" or "take me to a website for learning French." Also, for example, the user may navigate to a webpage that is related to learning the second language. Also, for example, the user may navigate to webpages that include content that is in the second language. In some implementations, interactions of the user with one or more language learning applications can be utilized by proficiency manager 130 to determine a second language proficiency measure for the user. For example, a user may download an application that is utilized to learn the second language, interact with one or more applications that are related to learning the second language, and/or otherwise utilize an application that, through the interactions of the user, may be used to determine a second language proficiency measure for the user.

In some implementations, subsequent interactions of the user (i.e., interactions that occur after the second language proficiency measure has been initially determined) may be utilized by proficiency manager 155 to adjust the second language proficiency measure of the user to reflect increased (or decreased) proficiency of the user. For example, as a user becomes more proficient in the second language, the user may submit queries and/or request translations that are more complex and/or include terms and/or grammar that indicates a level of proficiency that is more indicative of proficiency than previously determined. In those instances, the second language proficiency of the user can be reevaluated periodically and/or when the user utilizes vocabulary that is not included in the determined vocabulary for a user with the initially determined proficiency level.

In some implementations, the past interactions of the user that are related to the second language may be utilized by user interest manager 150 to determine a user interest measure for the user that is indicative of user interest in being provided with multilingual content that includes one or more phrases in the second language. For example, a user may submit one or more phrases and request the one or more phrases be translated into the second language. Also, for example, a user may interact with one or more applications that are configured to assist in language learning. Also, for example, the user may browse webpages with content in the second language, webpages related to learning the second language, and/or other resources that indicate the user has interest in a language other than the primary language of the user.

Verification manager 120 can determine, based on verification data associated with or derived from the audio data, whether to provide multilingual content to the user. A user can indicate, via an account, a request to be provided with that multilingual content. Verification data that is received with the audio data can include, but not limited to, account information that indicates the speaker that uttered the audio, an identifier of the user, and/or other information that can allow remote automated assistant component 110 to verify the user. For example, device automated assistant component 130 can analyze the audio data, determine a speaker based on the audio data, identify an account of the user, and provide account information to remote automated assistant component 110. Also, for example, the audio data can be sent to remote automated assistant component 110, which then can analyze the audio data, determine a speaker whose utterance is captured by the audio data, and further identify an account and/or profile associated with the user.

Once verification manager 120 has determined that the user has interest in being provided with multilingual content, response manager 125 can determine what multilingual content to provide as a response to the user query. In some implementations, the multilingual content can include a translation of a query into a second language. In some implementations, the multilingual content can include a translation of a response into a second language. Response manager 125 can determine, based on settings and/or other information associated with the user (e.g., user account information), what multilingual content to provide to the user. The multilingual content can then be provided to device automated assistant component 130, which can render the content via GUI 103 and/or audibly as synthesized speech via speaker 102.

Subsequent to remote automated assistant component 110 determining a response to a query provided by the user, response manager 125 can determine the multilingual content to provide to the user via an interface, such as GUI 103. In some implementations, response manager 125 can translate a response into a second language that has been specified by the user. For example, an account of the user can indicate that the user has a first language as a primary language and has interest in being provided with multilingual content in a second language, such as providing a response in both the first language and second language of the user.

Figure 2:
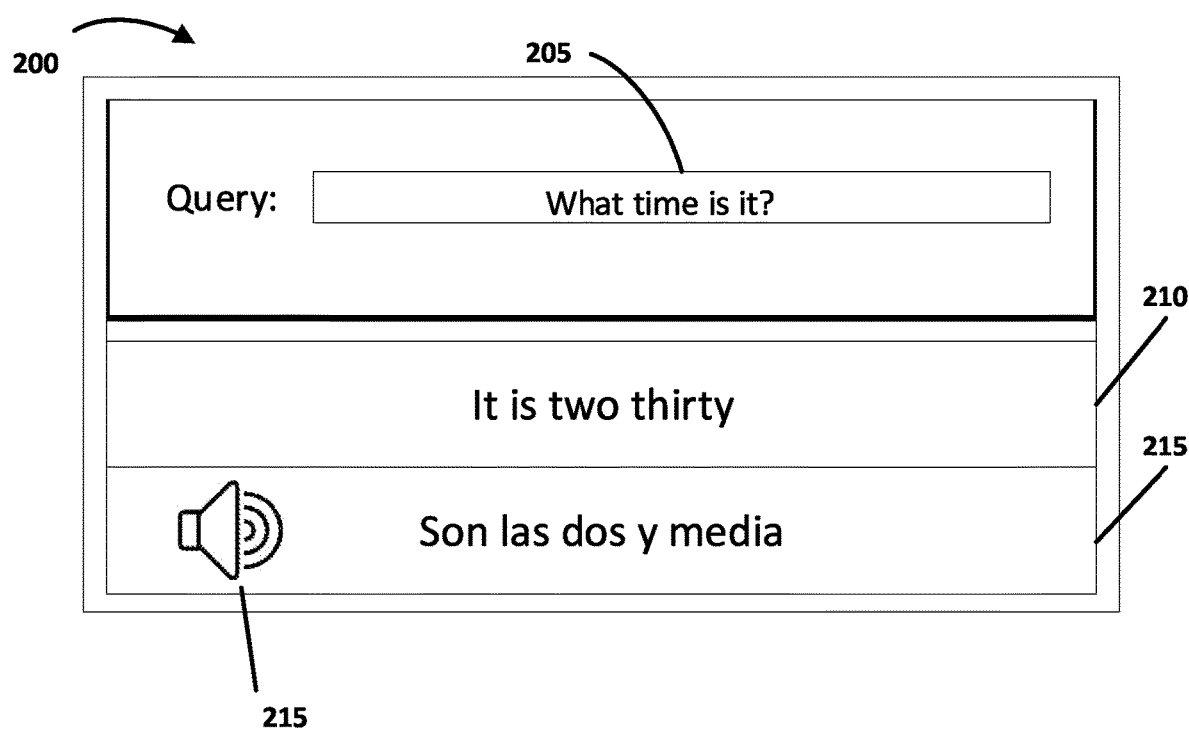
FIG. 2 is an illustration of an example graphical user interface that may be utilized for one or more implementations described herein.

Referring to FIG. 2, an example interface 200 that includes multilingual content is provided. The interface 200 includes the query 205 that was uttered by a user that has interest in being provided with multilingual content. The multilingual content includes the response in a first language 210 and a response 215 in a second language. As described above, the response 215 can be determined by response 125 by translating the first response 210 into the second language. Further, second response 215 includes an interactive icon 215 that, when interacted with, can cause synthesized speech to provide an audible pronunciation of the second response 215.

In some implementations, response manager 125 can determine multilingual content that includes the query that was submitted by the user into a second language. For example, the user may submit a query in a first language and response 125 can translate the query into the second language. The user may then be provided, by response manatee 125, multilingual content that includes the original query of the user, a translation of the query, and a response to the query via GUI 103.

Figure 3:
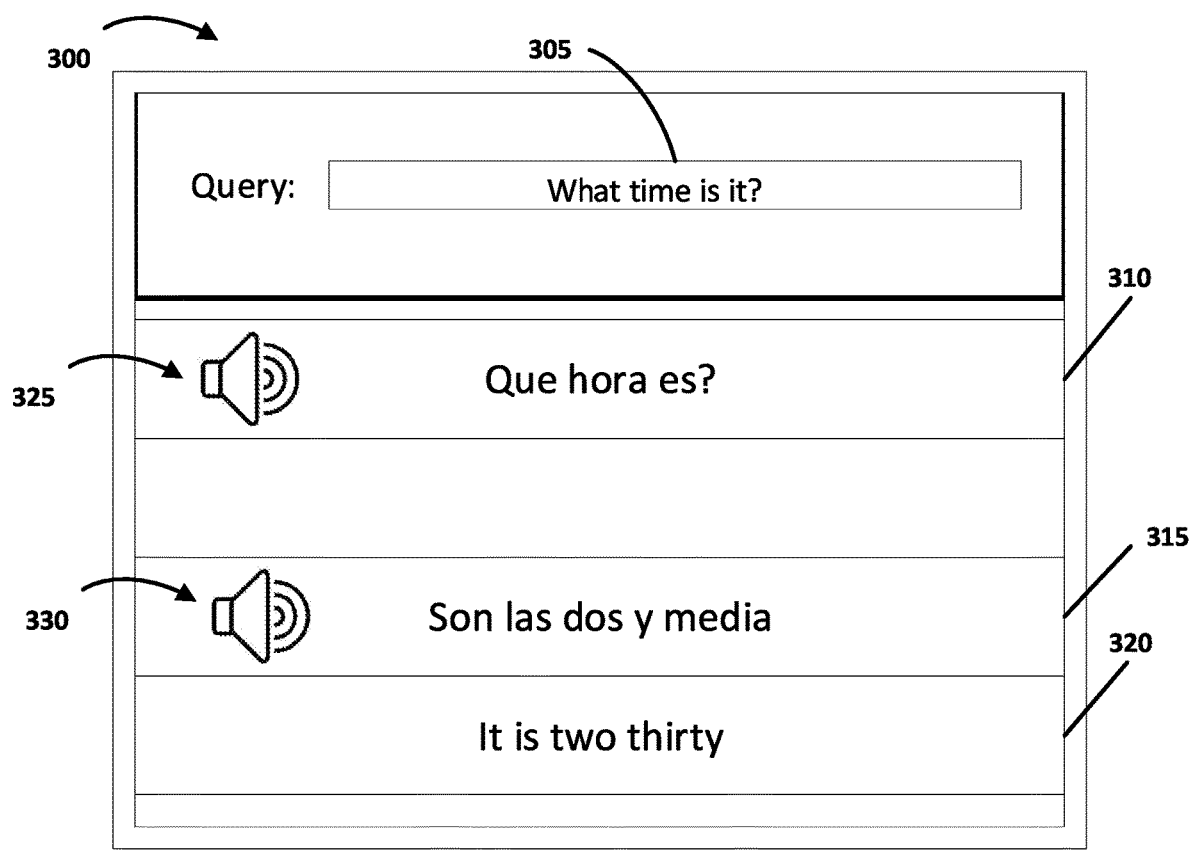
FIG. 3 is an illustration of an example graphical user interface that may be utilized for one or more implementations described herein.

Referring to FIG. 3, another example interface that includes multilingual content is provided. The interface 300 includes the query 305 that was submitted by the user and further includes, as part of the multilingual content, a translated version of the query 310. The translated query 310 further includes an interactive icon 325 that, when interacted with by the user, can cause speech to be rendered that pronounces the translated query 310. The interface 300 further includes the response 315 in the second language and the response in the first language 320. The response 315 in the second language further includes an interactive icon 330 that, when interacted with by the user, causes speech to be rendered that pronounces the response 315. In some implementations, response 315 and/or response 320 may be absent.

In some implementations, one or more words of the multilingual content may be rendered such that the rendered one or more words are interactive and/or are rendered with an interactive element. For example, one or more words may be rendered in a different color, in a different font, and/or otherwise in a different style to indicate that the word or words are interactive. Upon interacting with the word, words, or interactive element rendered with the word or words, the user can be provided with a pronunciation of that word or words. In this manner, the user can select the particular word or words to be provided with a pronunciation in lieu of being provided with the entire phrase.

In some implementations, response manager 125 can determine a query suggestion for the user as a follow-up query to the initially provided query. For example, for a query of "What is the weather today," response manager 125 can determine a query suggestion of "What is the weather tomorrow" based on determining a likelihood that the user may follow up the originally submitted query with the query suggestion. In some implementations, response manager 125 can determine a query suggestion in the first language of the user and further translate the query suggestion into a second language to provide as part of multilingual content.

Figure 4:
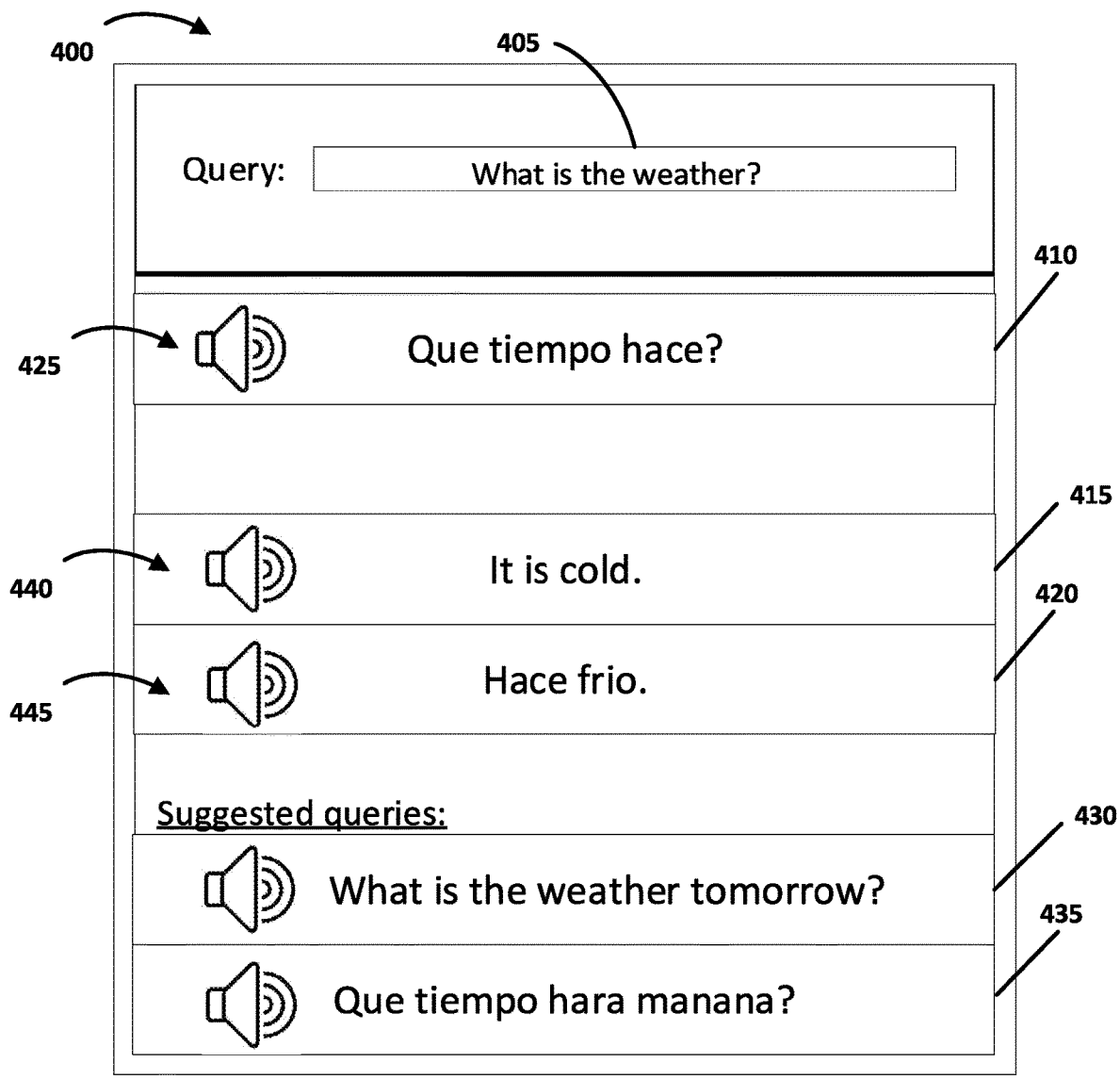
FIG. 4 is an illustration of an example graphical user interface that may be utilized for one or more implementations described herein.

Referring to FIG. 4, another example interface that includes multilingual content is provided. The multilingual content includes a query 305 that was submitted by the user as well as the query 410 translated into the second language. The query 410 in the second language is rendered with an interactive icon 425 that, when interacted with by the user, causes synthesized speech pronouncing the query 410. Further, the multilingual content includes a response 415 to the query in the first language of the user, with an interactive icon, and the response 420 in the second language, rendered with an interactive icon similar to icon 425.

The multilingual content further includes a query suggestion 430 that has been determined by response manager 125 as a possible followup query to query 405. For example, a user may have interest in being provided with the weather for tomorrow as a followup to submitting a request of "what is the weather." Additionally, the multilingual content includes a followup query 435 in the second language (i.e., "que tiempo hara manana"), which is a translation of the followup query 430 in the first language of the user.

In some implementations, responses to query suggestions can be pre-fetched to minimize latency in providing the responses. For example, a user can submit a query of "what is the weather," and followup query suggestions of "what is the weather tomorrow" and "que tiempo hara manana" (i.e., a second language query suggestions) can be generated by response manager 125. Further, to reduce latency in providing a response, in the instance where the user selects one or more of the query suggestions, the responses can be pre-fetched before and/or while the interface 400 is being rendered such that the responses are available to the device automated assistant component 130. Thus, when the user selects a followup query suggestion, the client device 100 can provide the response without requiring additional computing time in submitting the query to the remote automated assistant component 110.

In some implementations, interacting with an interactive element of an interface causes both the content in the primary language of the user and the content in the second language of the user to be sequentially audibly rendered. For example, referring again to FIG. 4, the response in the first language 415 includes an interactive icon 440 that, when interacted with by the user, causes the response 415 to be audibly rendered. Further, the multilingual content includes a second language response 420, with an interactive icon 445 which, when interacted with by the user, causes the second language response 420 to be audibly rendered. In some implementations, when the user interacts with icon 440, the first language response 415 may be audibly rendered followed by the second language response 420. Similarly, in some implementations, when the user interacts with icon 445, the second language response 420 may be audibly rendered followed by the first language response 415 being audibly rendered.

Still referring to FIG. 4, the first language query suggestion 430 is rendered with an interactive icon 450 that, when interacted with, can cause the first language query suggestion 430 to be audibly rendered. In some implementations, interacting with the interactive icon 450 can further cause the second language query suggestion 435 to be audibly rendered following the audible rendering of the first language query suggestion 430. Similarly, the second language query suggestions 435 is rendered with an interactive icon 455 that, when interacted with, can cause the second language query suggestions 435 to be audibly rendered. In some implementations, interactive with the interactive icon 455 can further cause the first language query suggestion 430 to be audibly rendered following the audible rendering of the second language query suggestion 435.

In some implementations, before response manager 125 provides the multilingual content to device automated assistant component 130 for rendering, complexity manager 145 may determine whether the proficiency measure of the user is sufficient to likely comprehend the content in the second language. As previously described, proficiency manager 155 can determine a proficiency measure for a user that is indicative of proficiency of the user in a second language. Once response manager 125 determines multilingual content that is responsive to the audio data that was received from device automated assistant component 130, complexity manager 145 can determine a complexity of the multilingual content. In some implementations, complexity manager 145 can determine that, based on the proficiency measure of the user, the multilingual content is more complex than is likely to be understood by the user. For example, for multilingual content that includes a second language response of "Hace frio," complexity manager 145 may determine a first complexity measure that is indicative of complexity of the response. Also, for example, for multilingual content that includes a second language response of "el tiempo hara frio manana," complexity manager 145 may determine a second complexity measure that is more indicative of complexity than the first complexity measure based on, for example, the number of terms, the complexity of term usage, and/or other grammatical rules that are required to be comprehended to understand and/or utilize the response. In instances where the complexity measure for multilingual content exceeds a threshold for the proficiency of a user, complexity manager 145 may determine not to provide the multilingual content.

Figure 5:
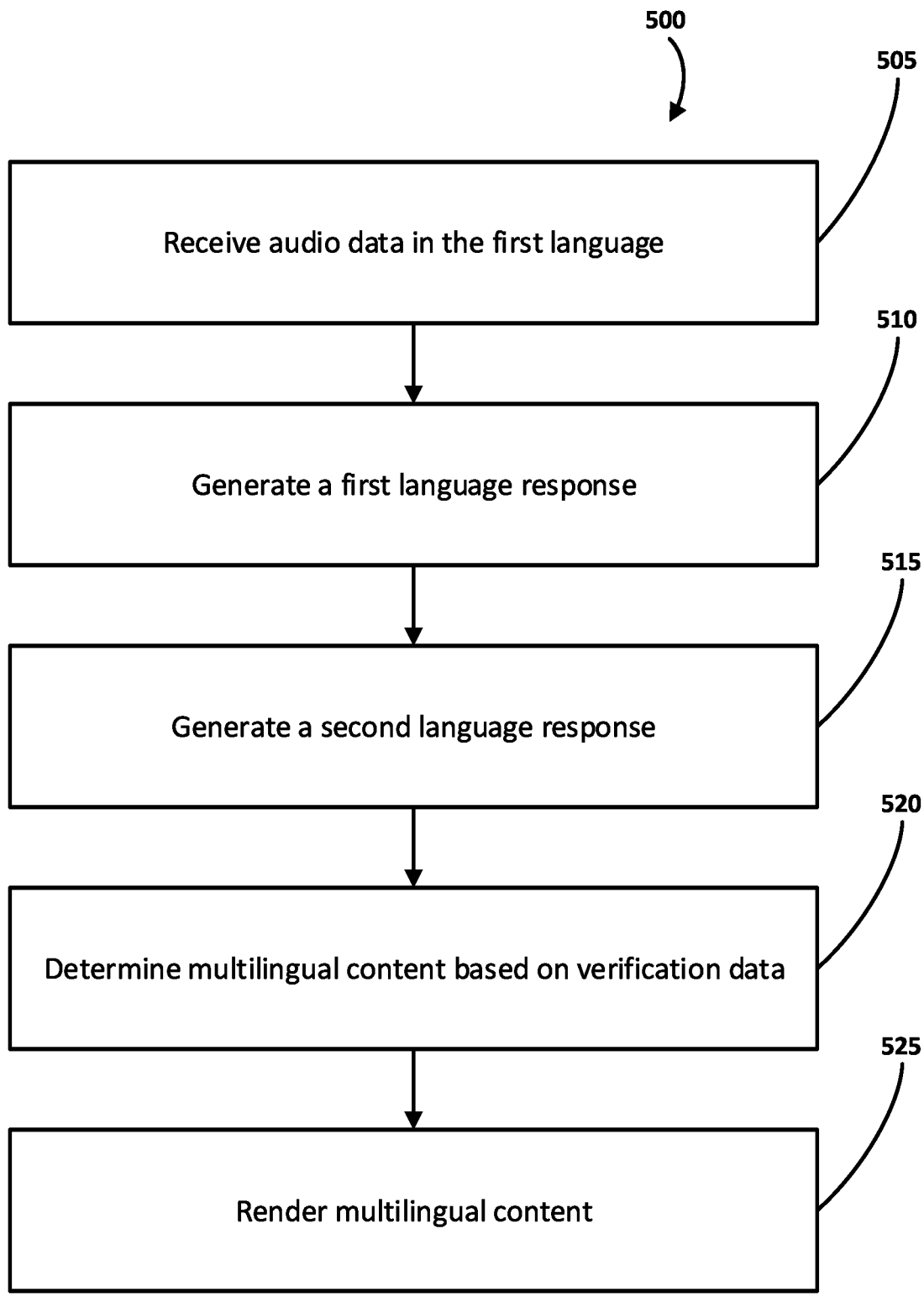
FIG. 5 is a flowchart of one or more implementations described herein.

Referring to FIG. 5, a flowchart 500 is provided that illustrates implementations described herein. In some implementations, one or more steps may be absent, one or more additional steps may be performed, and/or the illustrated steps may be performed in a different order.

At step 505, audio data in a first language is received. The audio data may be submitted to device automated assistant component 130 via microphone 101. Automatic speech recognizer 135 can process the audio data and provide a textual representation of the audio data to query processing application 105 for further processing. For example, automatic speech recognizer 135 can generate a textual representation of a query that is included in audio data and provide the textual representation to remote automated assistant component 110 for further processing. In some implementations, automatic speech recognition can be performed by one or more components of query processing application 105. For example, device automated assistant component 130 can provide the audio data directly to remote automated assistant component 110, which can perform automatic speech recognition and further process the query, as described herein.

At step 510, a first language response is generated. The first language can be a primary language of the user and/or a language that the user has selected as one of the languages that the user has interest in utilizing to submit queries and/or to receive responses. For example, the user may submit a query of "turn on the kitchen lights" to device automated assistant component 130 and a response can be generated by response 125 that includes a response in a first language of "ok, I turned on the kitchen lights" along with an action of communicating with a smart light that is labeled as "kitchen lights" to turn off the light.

At step 515, a second language response is generated. The second language response can be generated based on the provided query from the user as well as the first language response in the first language. For example, the second language response can have the same intent as the first language response and/or be a translation of the first language response. The first language response and/or the second language response can be generated by a component that shares one or more characteristics with response manager 125. As an example, a first language response can be "it is cold" and the second language response can be "hace frio," which is a translation of the first language response into Spanish as a second language.

At step 520, multilingual content is determined based on verification data. The multilingual content includes the first language response and the second language response and can be, for example, a first language response to the submitted query, a second language response to the first language query, a second language translation of the submitted query, and/or query suggestions in first and/or second language. In some implementations, the verification data can be determined by verification manager 120 and can include a verification of the speaker of the audio data. For example, an indication of a user account can be provided with the audio data that may be utilized by verification manager 120 to determine the speaker of the audio data and/or verification manager 120 may process the audio data to identify a user profile associated with the speaker of the query.

At step 525, the multilingual content is rendered at an assistant interface of a client device. In some implementations, the rendered content may be rendered with interactive icons that, when interacted with by the user, cause audible renderings of the associated content. For example, content may be rendered that shares one or more characteristics with the interfaces illustrated in FIGS. 2-4.

Figure 6:
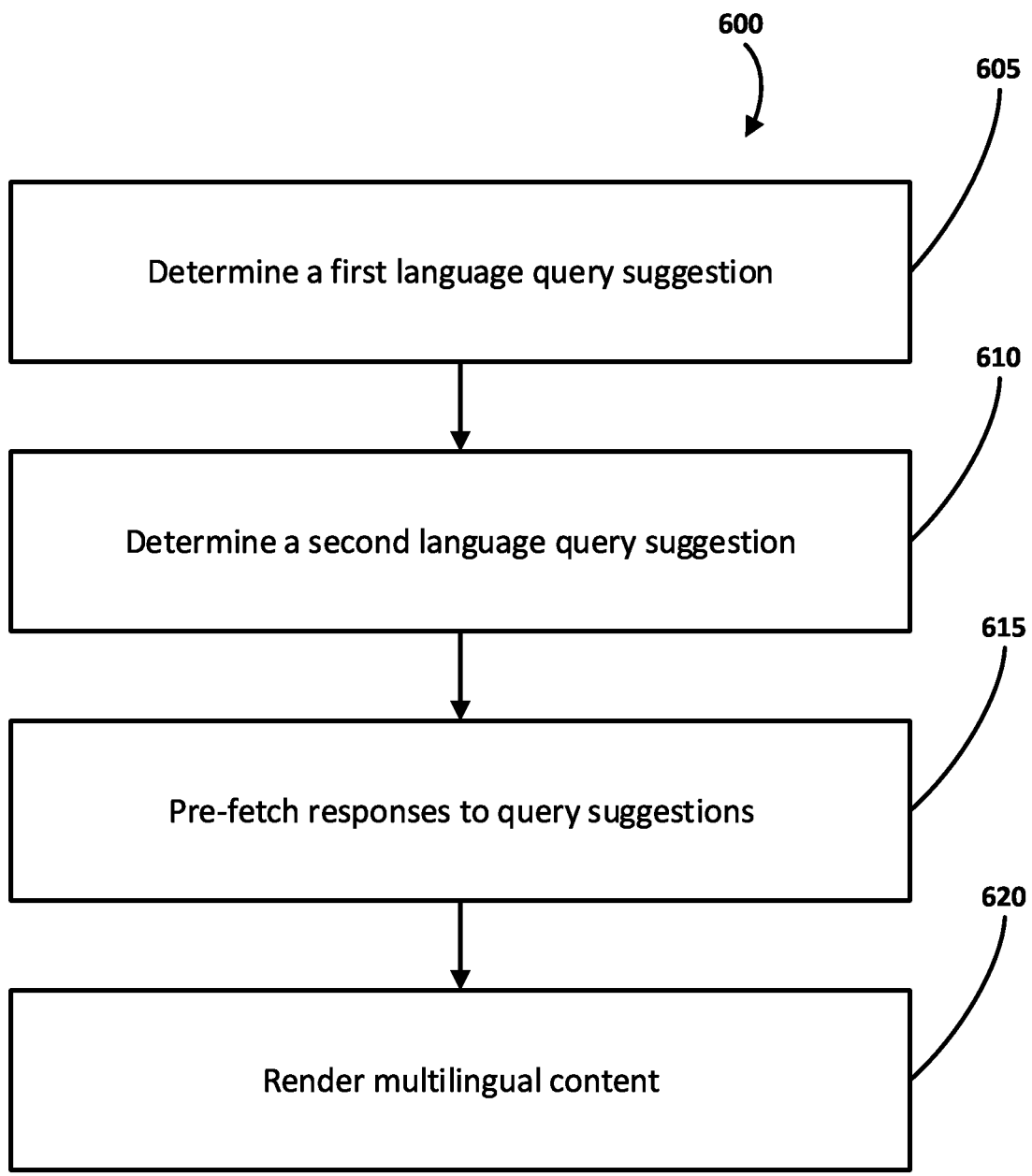
FIG. 6 is a flowchart of one or more additional implementations described herein.

Referring to FIG. 6, a flowchart is provided that illustrates additional implementations described herein. In some implementations, one or more steps may be absent, one or more additional steps may be performed, and/or the illustrated steps may be performed in a different order. However, in instances wherein the method 600 is implemented, the pre-fetching of a response to the query suggestions occurs before the query suggestions are provided to the user.

At step 605, a first language query suggestion is determined. The query suggestion can be a follow-up suggestion to the query that was provided by the user via the audio data. For example, the user may submit a query of "what is the weather today" and "what will the weather tomorrow" can be generated as a first language query suggestion. At step 610, a second language query suggestion is determined. The second language query suggestion can have the same intent as the first language query suggestion. For example, a second language query suggestion of "que tiempo hara manana" can be generated which, when submitted to an automated assistant, may result in being provided with the weather tomorrow, either in the first language or the second language of the user.

At step 615, a response to the query suggestions is pre-fetched. The pre-fetching occurs prior to the multilingual content being provided to device automated assistant component 130 for rendering. For example, a response to the queries can be generated at step 615 by response manager 125, the response(s) to the query suggestion(s) can be determined by response manager 125, and the query suggestions can be subsequently provided to device automated assistant component 130 for further processing.

At step 620, the query suggestions are rendered, as multilingual content, at an assistant interface of a client device. In some implementations, the rendered content may be rendered with interactive icons that, when interacted with by the user, cause audible renderings of the associated content. For example, content may be rendered that shares one or more characteristics with the interfaces illustrated in FIG. 4.

Figure 7:
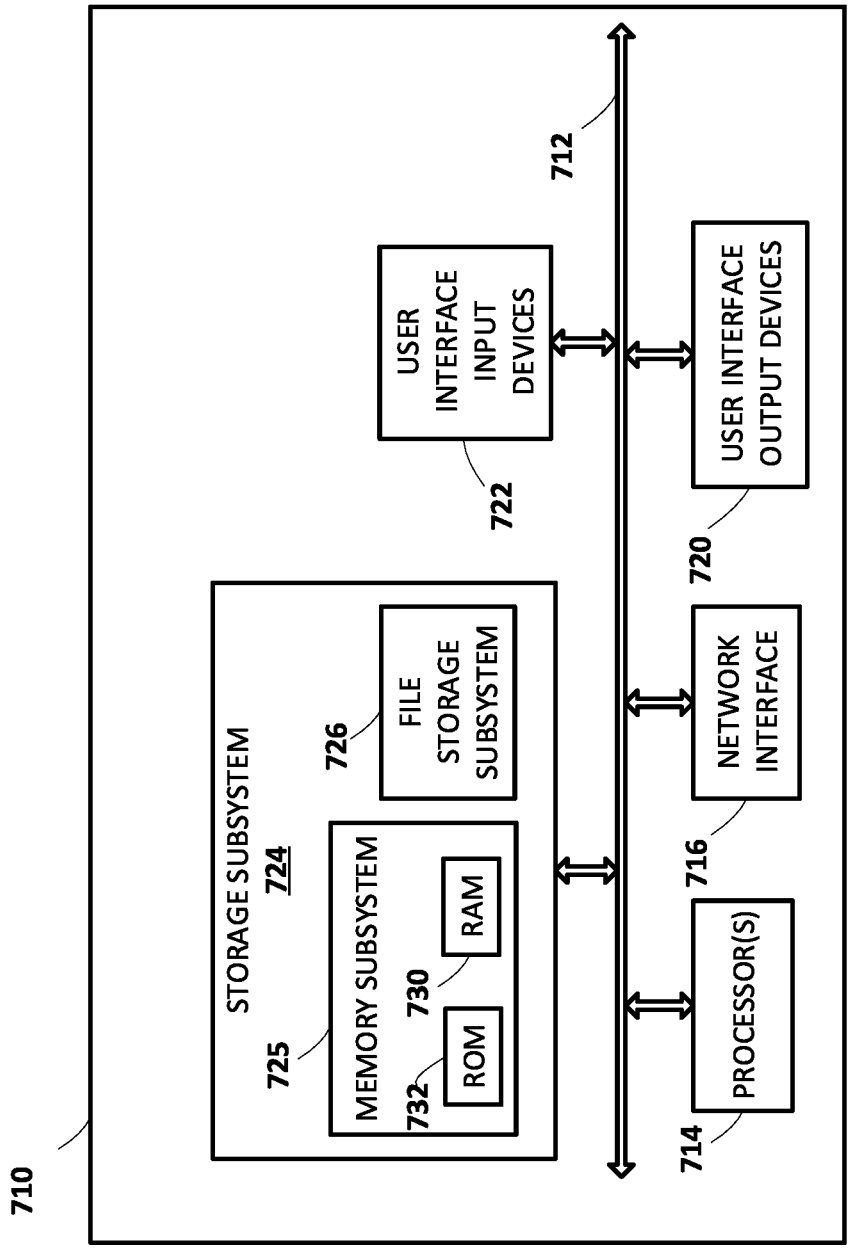
FIG. 7 illustrates an example architecture of a computing device.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500, and/or to implement one or more of client device 100, query processing application 105, an operating system executing query processing application 105 and/or one or more of its components, an automated assistant, and/or any other engine, module, chip, processor, application, etc., discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In some implementations, a method implemented by one or more processors is provided and includes receiving audio data that captures a spoken query of a user that is in a first language, wherein the spoken query is provided via an automated assistant interface of a client device, and wherein the first language is specified as a primary language for the user, generating based on processing the audio data, a first language response to the spoken query, wherein the first language response is in the first language, generating a second language response, to the spoken query, that is in the second language, wherein the second language is specified as a secondary language of interest to the user, determining, based on verification data provided with or derived from the audio data, to render multilingual content in response to the spoken query, the multilingual content including the first language response and the second language response, and, in response to determining to render the multilingual content, causing the multilingual content to be rendered at the assistant interface of the client device and in response to the spoken query.

These and other implementations of the technology disclosed herein can include one or more of the following features.

In some implementations, the method further includes causing one or more actions to be performed in response to receiving the audio data.

In some implementations, causing the multilingual content to be rendered at the assistant interface of the client device includes causing the first language response to be audibly rendered as first synthesized speech output and then causing the second language response to be audibly rendered as second synthesized speech output.

In some implementations, the method further includes generating a second language query by translating first language recognized text, of the spoken query, to the second language; and in response to determining to render the multilingual content, causing the second language query to be rendered at the assistant interface of the client device and in response to the spoken query.

In some implementations, the method further includes causing the second language query to be visually rendered with a selectable audible rendering interface element, wherein the audible rendering interface element, when selected, causes the second language query to be audibly rendered as synthesized speech output.

In some implementations, the method further includes determining a query suggestion, wherein determining the query suggestion is based on the spoken query, the first language response, and/or the second language response; and in response to determining to render the multilingual content, causing a first language version of the query suggestion and a second language version of the query suggestion to be rendered at the assistant interface of the client device and in response to the spoken query. In some of those implementations, the method further includes causing the second language query to be visually rendered with a selectable audible rendering interface element, wherein the audible rendering interface element, when selected, causes the second language query to be audibly rendered as synthesized speech output.

In some implementations, generating the second language response is performed in response to determining to render the multilingual content.

In some implementations, the method further includes determining a query suggestion, wherein determining the query suggestion is based on the spoken query, the first language response, and/or the second language response, and in response to determining to render the multilingual content, causing a first language version of the query suggestion and a second language version of the query suggestion to be rendered at the assistant interface of the client device and in response to the spoken query. In some of those implementations, the method further includes receiving a selection of the first language version of the query suggestion, and in response to receiving the selection of first language version, causing a first language response to the query suggestion to be audibly rendered, and causing a second language response to the query suggestion to be audibly rendered subsequent to causing the first language response to be audibly rendered. In other of those implementations, the method further includes receiving a selection of the second language version of the query suggestion, and in response to receiving the selection of second language version, causing a second language response to the query suggestion to be audibly rendered; and causing a first language response to the query suggestion to be audibly rendered subsequent to causing the first language response to be audibly rendered. In still other of those implementations, selection of the first language version causes a first language response to the query suggestion to be audibly rendered, and causes a second language response to the query suggestion to be audibly rendered subsequent to causing the first language response to be audibly rendered, and selection of the second language version causes the second language response to be audibly rendered, and causes the first language response to be audibly rendered subsequent to causing the first language response to be audibly rendered.

In some implementations, the method includes determining a user proficiency measure that is specific to the user and that is specific to the second language, wherein determining to render the multilingual content is further based on the user proficiency measure. In some of those implementations, the method includes determining a complexity measure of the second language response, wherein determining to render the multilingual content based on the user proficiency measure includes determining to render the multilingual content based on comparing the user proficiency measure to the complexity measure of the second language response. In some of those implementations, determining the complexity measure includes determining, based on the terms of the second language response, a comprehension level for the second language response, wherein the comprehension level is indicative of level of skill in the second language that is sufficient to comprehend the second language response. In some other of those implementations, determining to render the multilingual content based on the user proficiency measure comprises determining that the user proficiency measure satisfies a threshold.

In some implementations, the method includes determining a user interest measure indicative of user interest in being provided with content in the second language, wherein determining to render the multilingual content is further based on the user interest measure.

In some implementations, the verification data includes an identifier of the user that provided the audio data, wherein the user has previously indicated an interest in being provided multilingual content.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before the data is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
   receiving audio data that captures a spoken query of a user that is in a first language, wherein the spoken query is provided via an automated assistant interface of a client device, and wherein the first language is specified as a primary language for the user;
   generating, based on processing the audio data, a first language response to the spoken query, wherein the first language response is in the first language;
   generating a second language response, to the spoken query, that is in the second language, wherein the second language is specified as a secondary language of interest to the user;
   determining, based on verification data provided with or derived from the audio data, to render multilingual content in response to the spoken query, the multilingual content including the first language response and the second language response;
   in response to determining to render the multilingual content:
      causing the multilingual content to be rendered at the assistant interface of the client device and in response to the spoken query;
   determining a query suggestion, wherein determining the query suggestion is based on the spoken query, the first language response, and/or the second language response;
   in response to determining to render the multilingual content:
      causing a first language version of the query suggestion and a second language version of the query suggestion to be rendered at the assistant interface of the client device in response to the spoken query;

prior to receiving any selection of the first language version of the query suggestion or the second language version of the query suggestion:

generating a first response to the query suggestion in the first language;

generating a second response to the query suggestion in the second language; and causing the first response and the second response to be cached;

receiving a selection of the first language version of the query suggestion; and in response to receiving the selection of first language version of the query suggestion:

causing the cached first response to the query suggestion to be audibly rendered; and causing the cached second response to the query suggestion to be audibly rendered subsequent to causing the cached first response to the query suggestion to be audibly rendered.

2. The method of claim 1, further comprising:
causing one or more actions to be performed in response to receiving the audio data.

3. The method of claim 1, wherein causing the multilingual content to be rendered at the assistant interface of the client device comprises:

causing the first language response to be audibly rendered as first synthesized speech output and then causing the second language response to be audibly rendered as second synthesized speech output.

4. The method of claim 1, further comprising:
generating a second language query by translating first language recognized text, of the spoken query, to the second language; and in response to determining to render the multilingual content:
causing the second language query to be rendered at the assistant interface of the client device and in response to the spoken query.

5. The method of claim 4, further comprising:
causing the second language query to be visually rendered with a selectable audible rendering interface element, wherein the audible rendering interface element, when selected, causes the second language query to be audibly rendered as synthesized speech output.

6. The method of claim 1, wherein generating the second language response is performed in response to determining to render the multilingual content.

7. The method of claim 1, further comprising:
receiving a selection of the second language version of the query suggestion; and in response to receiving the selection of second language version of the query suggestion:

causing the cached second response to the query suggestion to be audibly rendered; and causing the cached first response to the query suggestion to be audibly rendered subsequent to causing the cached second response to the query suggestion to be audibly rendered.

8. The method of claim 1, further comprising:
determining a user proficiency measure that is specific to the user and that is specific to the second language, wherein determining to render the multilingual content is further based on the user proficiency measure.

9. The method of claim 8, further comprising:
determining a complexity measure of the second language response, wherein determining to render the multilingual content based on the user proficiency measure comprises:

determining to render the multilingual content based on comparing the user proficiency measure to the complexity measure of the second language response.

10. The method of claim 9, wherein determining the complexity measure comprises:

determining, based on the terms of the second language response, a comprehension level for the second language response, wherein the comprehension level is indicative of level of skill in the second language that is sufficient to comprehend the second language response.

11. The method of claim 8, wherein determining to render the multilingual content based on the user proficiency measure comprises determining that the user proficiency measure satisfies a threshold.

12. The method of claim 1, further comprising:
determining a user interest measure indicative of user interest in being provided with content in the second language, wherein determining to render the multilingual content is further based on the user interest measure.

13. The method of claim 1, wherein the verification data includes an identifier of the user that provided the audio data, wherein the user has previously indicated an interest in being provided multilingual content.

14. A method implemented by one or more processors, the method comprising:

receiving audio data that captures a spoken query of a user that is in a first language, wherein the spoken query is provided via an automated assistant interface of a client device, and wherein the first language is specified as a primary language for the user;

generating, based on processing the audio data, a first language response to the spoken query, wherein the first language response is in the first language;

generating a second language response, to the spoken query, that is in the second language, wherein the second language is specified as a secondary language of interest to the user;

determining, based on verification data provided with or derived from the audio data, to render multilingual content in response to the spoken query, the multilingual content including the first language response and the second language response;

in response to determining to render the multilingual content:
causing the multilingual content to be rendered at the assistant interface of the client device and in response to the spoken query;

determining a query suggestion, wherein determining the query suggestion is based on the spoken query, the first language response, and/or the second language response;

in response to determining to render the multilingual content:
causing a first language version of the query suggestion and a second language version of the query suggestion to be rendered at the assistant interface of the client device in response to the spoken query;

prior to receiving any selection of the first language version of the query suggestion or the second language version of the query suggestion:

generating a first response to the query suggestion in the first language;
generating a second response to the query suggestion in the second language; and
causing the first response and the second response to be cached;
receiving a selection of the second language version of the query suggestion; and
in response to receiving the selection of second language version:
causing the cached second response to the query suggestion to be audibly rendered; and
causing the cached first response to the query suggestion to be audibly rendered subsequent to causing the cached second response to the query suggestion to be audibly rendered.

15. The method of claim 14, further comprising:
causing one or more actions to be performed in response to receiving the audio data.

16. The method of claim 14, wherein causing the multilingual content to be rendered at the assistant interface of the client device comprises:
causing the first language response to be audibly rendered as first synthesized speech output and then causing the second language response to be audibly rendered as second synthesized speech output.

17. A method implemented by one or more processors, the method comprising:
receiving audio data that captures a spoken query of a user that is in a first language, wherein the spoken query is provided via an automated assistant interface of a client device, and wherein the first language is specified as a primary language for the user;
generating, based on processing the audio data, a first language response to the spoken query, wherein the first language response is in the first language;
generating a second language response, to the spoken query, that is in the second language, wherein the second language is specified as a secondary language of interest to the user;
determining, based on verification data provided with or derived from the audio data, to render multilingual content in response to the spoken query, the multilingual content including the first language response and the second language response;
in response to determining to render the multilingual content:
causing the multilingual content to be rendered at the assistant interface of the client device and in response to the spoken query;
determining a query suggestion, wherein determining the query suggestion is based on the spoken query, the first language response, and/or the second language response;
prior to receiving any selection of a first language version of the query suggestion or a second language version of the query suggestion:
generating a first response to the query suggestion in the first language;
generating a second response to the query suggestion in the second language; and
causing the first response and the second response to be cached; and
in response to determining to render the multilingual content:
causing the first language version of the query suggestion and the second language version of the query suggestion to be rendered at the assistant interface of the client device in response to the spoken query;
wherein selection of the first language version of the query suggestion causes the cached first response to the query suggestion to be audibly rendered, and causes the cached second response to the query suggestion to be audibly rendered subsequent to causing the cached first response to the query suggestion to be audibly rendered, and
wherein selection of the cached second version of the query suggestion causes the cached second response to the query suggestion to be audibly rendered, and causes the cached first response to the query suggestion to be audibly rendered subsequent to causing the cached second response to the query suggestion to be audibly rendered.

18. The method of claim 17, further comprising:
causing one or more actions to be performed in response to receiving the audio data.

19. The method of claim 17, wherein causing the multilingual content to be rendered at the assistant interface of the client device comprises:
causing the first language response to be audibly rendered as first synthesized speech output and then causing the second language response to be audibly rendered as second synthesized speech output.

* * * * *